United States Patent [19]
Cargile

[11] 4,107,975
[45] * Aug. 22, 1978

[54] METHOD AND APPARATUS FOR TESTING SHOCK ABSORBERS AND THE LIKE

[76] Inventor: William P. Cargile, 206 El Granada Blvd., Half Moon Bay, Calif. 94019

[*] Notice: The portion of the term of this patent subsequent to Jul. 12, 1994, has been disclaimed.

[21] Appl. No.: 805,988

[22] Filed: Jun. 13, 1977

Related U.S. Application Data

[63] Continuation-in-part of Ser. No. 716,632, Aug. 23, 1976, Pat. No. 4,034,596.

[51] Int. Cl.² .................................... G01M 17/04
[52] U.S. Cl. ....................................... 73/11
[58] Field of Search .......................... 73/11, 70, 71.7

[56] References Cited

U.S. PATENT DOCUMENTS

| 3,830,093 | 8/1974 | Emerson | 73/11 |
| 3,857,276 | 12/1974 | Fader et al. | 73/11 |
| 4,034,596 | 7/1977 | Cargile | 73/11 |

FOREIGN PATENT DOCUMENTS

| 637,959 | 3/1962 | Canada | 73/11 |
| 2,403,343 | 7/1975 | Fed. Rep. of Germany | 73/11 |

Primary Examiner—Anthony V. Ciarlante
Attorney, Agent, or Firm—Thomas H. Olson

[57] ABSTRACT

A transducer for placement in fixed relation to the axle/wheel assembly of a vehicle and adjacent to the body of the vehicle, the transducer cooperating with the vehicle body to form a reactance that has a magnitude proportional to the distance between the transducer and the vehicle body. The magnitude of the reactance thus varies in response to variations in distance between the vehicle body and the transducer when the body is caused to experience oscillation on the springs thereof. Such oscillation is damped by the vehicle shock absorbers. A capacitive transducer and an inductive transducer, both of which include a guard or shield which shields the transducer from ground. An oscillator circuit wherein the frequency of oscillation is determined by the above mentioned reactance, the oscillator circuit having a non-ground common to which the guard is connected. A method for testing shock absorbers by employment of the transducer and oscillator circuit which includes the steps of displacing the vehicle from a quiescent position to load the springs in the vehicle, releasing the vehicle body so that it can return to the quiescent position and measuring the time variation of the reactance as the vehicle body vibrationally returns to the quiescent condition so as to afford an objective evaluation of the damping action of the vehicle shock absorbers.

11 Claims, 11 Drawing Figures

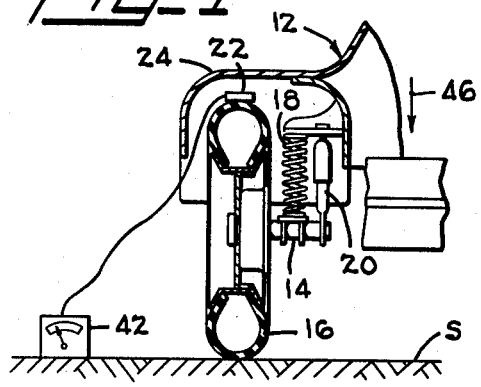
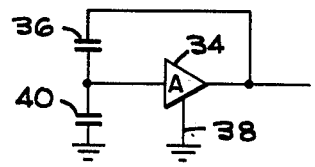
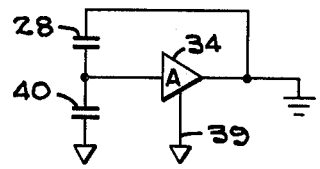
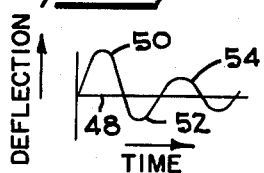
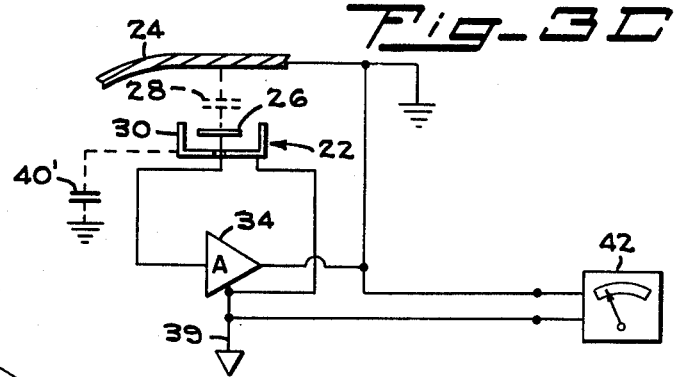
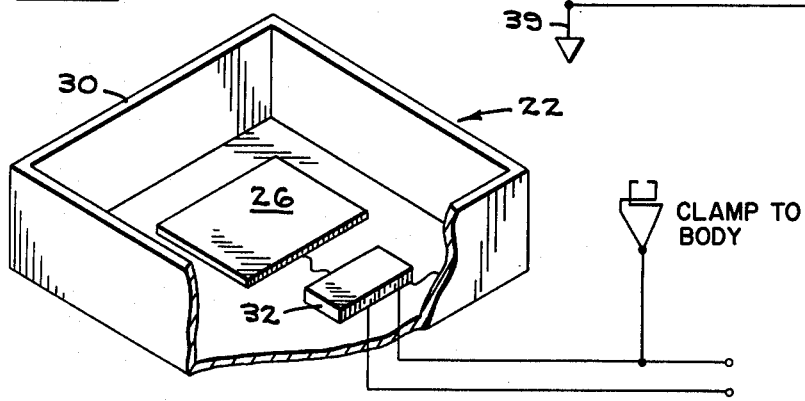
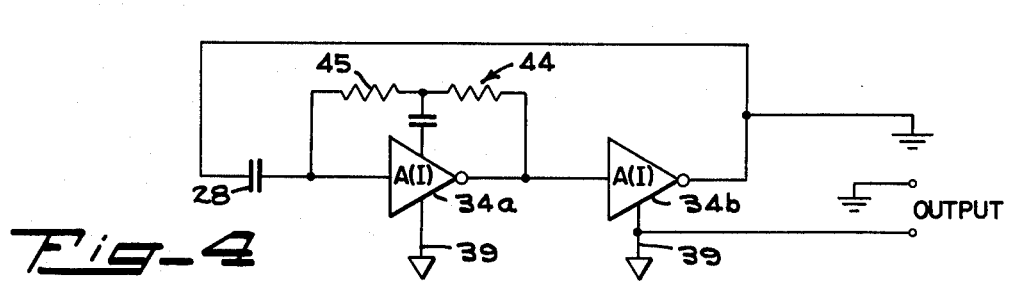

METHOD AND APPARATUS FOR TESTING SHOCK ABSORBERS AND THE LIKE

CROSS-REFERENCE TO RELATED APPLICATION

This is a continuation-in-part of U.S. application for patent, Ser. No. 716,632, filed Aug. 23, 1976, now U.S. Pat. No. 4,034,596.

BACKGROUND OF THE INVENTION

1. Field of the Invention

This invention relates to a method and apparatus for testing shock absorbers and the like, and more particularly to such method and apparatus which establishes a capacitance between the axle/wheel assembly and the body of a vehicle and then measures the variation of such capacitance as the vehicle body is displaced from a quiescent position and permitted to vibrationally return to the quiescent position.

2. Description of the Prior Art

The principal prior art technique for testing shock absorbers is a subjective technique wherein one operates a vehicle and senses the vibrations experienced by the vehicle. Because of the significant subjectivity involved in this method, those who profit by replacing shock absorbers have a substantial motivation for perceiving defects that may not in fact exist.

The only known objective procedure for testing shock absorbers, exemplified by U.S. Pat. No. 3,830,093, involves the connection of a pen to the vehicle body, placing a strip chart adjacent the pen, and advancing the strip chart as the vehicle is displaced from a quiescent position and permitted to return to that position. Such apparatus is not only cumbersome but requires substantial ability to analyze and interpret the graph produced by employment of such apparatus.

SUMMARY OF THE INVENTION

According to the present invention a small transducer is provided which transducer can be placed on the top of a vehicle tire so that the transducer is in spaced relation to the vehicle fender or other part of the vehicle body. The transducer is constructed to cooperate with a part of the vehicle body to form a reactance which has a magnitude that varies with the distance between the transducer and the body. Measurement of the variation of the reactance in response to movement of the body relative to the tire, which movement is damped by vehicle's shock absorber, affords an objective indication of shock absorber performance.

In one embodiment of the invention, the transducer has an antenna plate which forms one plate of a capacitor, the confronting part of the vehicle body forming the other plate of the capacitor. Movement of the vehicle body toward and away from the transducer antenna plate varies the capacitance and a measurement of the capacitance and the time variation thereof as the vehicle oscillates relative to the tire affords an objective indication of shock absorber performance.

There is substantial capacitance between the transducer and the ground or floor surface on which the body resides. Such capacitance, if permitted to exist in parallel with the transducer-body capacitance makes impossible measurements in variation of the transducer-body capacitance which are extremely small compared with the transducer-ground capacitance. Accordingly, the invention provides a transducer wherein the antenna plate is guarded or shielded from ground so that the transducer-body capacitance is not shunted by the transducer-ground capacitance.

In another embodiment, the transducer has an inductor which produces a flux field that intersects a magnetic part of the vehicle body so that the inductive reactance of the inductor varies with the distance between the transducer and the vehicle body part. Measurement of the inductive reactance and its variation with time also affords an objective indication of shock absorber performance.

An object of the present invention is to provide a transducer which can produce a capacitance relative to the vehicle body which is not shunted by the transducer-ground capacitance. This object is achieved in accordance with the present invention by supporting the antenna plate in a metallic housing and by connecting the metallic housing to a common and ungrounded circuit point in an oscillator of which the transducer-body capacitance is the frequency determinative element so that variation in the latter capacitance will effect a measurable variation in the frequency of oscillation.

Another object of the present invention is to provide an apparatus for producing a measurable signal which is independent of adjacent capacitances of large magnitude. This object is achieved in accordance to the invention by shielding from the transducer antenna plate referred to above the capacitance between the transducer and the ground, such shielding being achieved by providing metallic walls substantially surrounding the antenna plate and by connecting the wall to the common point in the oscillator circuit which the body-transducer capacitance is the frequency determining element.

Yet another object is to provide a transducer which has an inductance adapted for placement in flux linked opposition to a part of the vehicle body so that the magnitude of the inductive reactance is a function of the distance between the inductor and the vehicle body part. Such inductive reactance is measured, for example, by incorporating the inductor as a frequency determining element in an oscillator circuit.

A further object is to provide a method and apparatus for testing shock absorbers in situ. Achievement of this object promotes frequent testing of shock absorbers because the testing requires no diassembly of the vehicle and is made possible by providing a transducer that is small enough to be placed on top of the vehicle tire without employment of fasteners or like accoutrements.

The foregoing together with other objects features and advantages will be more apparent after referrring to the following specification and the accompanying drawing.

BRIEF DESCRIPTION OF THE DRAWING

FIG. 1 is a diagrammatic view of a system in accordance with the invention installed on a vehicle.

FIG. 2 is a perspective view of a transducer according to the present invention, portions being broken away to reveal internal details.

FIG. 3A is a schematic diagram of an oscillator connected as taught by the prior art to produce a signal determined by capacitance.

FIG. 3B is a schematic diagram showing an oscillator connected according to the present invention.

FIG. 3C is a schematic diagram of an oscillator of FIG. 3B connected in the apparatus of the invention.

FIG. 4 is a more detailed block diagram of an oscillator employed as an element in the present invention.

FIG. 5 is a plot of vehicle deflection versus time showing the typical time variation of a vehicle as it is damped by the presence of a shock absorber.

DESCRIPTION OF THE PREFERRED EMBODIMENT

Figure 6:
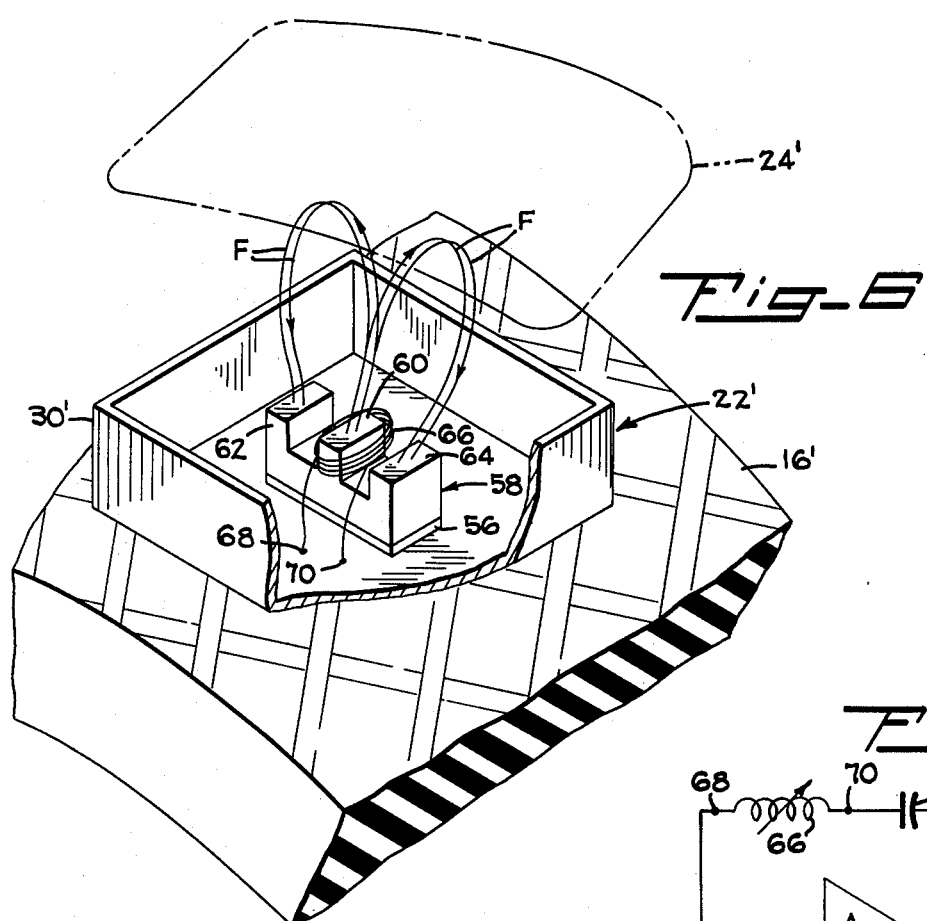
FIG. 6 is a perspective view of a transducer employing an inductor, portions being broken away to reveal internal details.

Referring more particularly to the drawings reference numeral 12 indicates a fragment of a motor vehicle. Vehicle 12 is typically supported on an axle 14 which is supported for movement over a road surface S by rubber tired wheels, one of which is shown in FIG. 1 at 16. The body of vehicle 12 is suspended on axle 14 by a spring 18 and there is a shock absorber 20 extending between the body and the axle to damp vibrations between the body and the axle as wheel 16 encounters irregularities in surface S. Shock absorber 20 is subject to gradual deterioration with age and objective measurement of the performance of the shock absorber permits replacement thereof at the appropriate time.

According to the invention there is a transducer 22 which is placed on the top of wheel 16 in confronting relation to a fender 24 which constitutes a part of the body of vehicle 12. Transducer 22 includes a flat conductive antenna plate 26 which forms in cooperation with the surface of fender 24 a capacitance, such capacitance being identified schematically at 28 in FIG. 3C. Plate 26 is insulatively supported in a metal boxlike shield 30 which forms a guard surrounding plate 26 to avoid interaction between the plate and wheel 16 which is at the same (ground) potential as is fender 24. Mounted within boxlike shield 30 is an integrated circuit element 32, which constitutes an oscillator, the frequency of which is controlled by the capacitive reactance of capacitance 28 which in turn is proportional to the distance between the transducer and fender 24.

In order to more clearly explain the operation of transducer 22 as a frequency determining element in the oscillator circuit, a conventional oscillator configuration will be briefly described in connection with FIG. 3A. In FIG. 3A there is an amplifier 34 the output of which is fed back through a capacitor 36 to sustain oscillation at a frequency determined by the magnitude of the capacitive reactance of capacitor 36. Typically the common point of amplifier 34 is grounded, as shown at 38. In FIG. 3A a parallel capacitor 40 is shown; if the capacitance of capacitor 40 is large as compared to the capacitance of capacitor 36, variations in capacitor 36 will have an insignificantly small effect on the frequency of oscillation of the circuit. If the circuit of FIG. 3A were employed with transducer 22 in the present environment, capacitor 40 would be formed by the transducer antenna plate and ground; such capacitor is of relatively large value so that any variation in the capacitance 36, represented by the capacitance between plate 26 and the vehicle body would have little or no effect on the frequency of oscillation of the circuit.

FIGS. 3B and 3C depict an oscillator circuit arranged for employment in practicing the present invention. The common point of amplifier 34 is not grounded; instead the output terminal of the amplifier is grounded. As shown in FIG. 3C the common point is connected to boxlike shield 30 so that the capacitive reactance of capacitor 28 substantially exclusively dictates the frequency of oscillation of the oscillator circuit. Capacitance between shield 30 and ground, indicated at 40' in FIG. 3C, does not materially influence the input of amplifier 34 and therefore does not shunt or otherwise override the effect of variations in capacitor 28. Because the capacitance of capacitor 28 depends substantially exclusively on the distance between fender 24 and antenna plate 26 within transducer 22, frequency of oscillation of the circuit will vary with such distance so as to produce a signal the frequency of which is a function of the instantaneous distance between the tire and the fender. Such signal is connected to a signal analyzing and display unit 42 in which it is reduced by any suitable circuitry to produce a visual output indicating whether the shock absorber 20 conforms to specifications or requires replacement. Thus, operating amplifier 34 with the common point floating (i.e. not grounded) eliminates the adverse effects of large spurious capacitances.

Amplifier 34 has been disclosed somewhat schematically hereinabove; a more detailed disclosure of the actual circuitry is shown in FIG. 4. As can be seen in FIG. 4, there are two inverting amplifiers 34a and 34b which are cascaded so that the feedback signal from the output of amplifier 34b to the input of amplifier 34a through capacitor 28 is phased to sustain oscillation at a frequency determined by the capacitance in conjunction with a resistance 45. Additionally, amplifier 34a is provided with a biasing network 44 which establishes the DC input level of the amplifier at the threshold value of the amplifier in order to facilitate starting of oscillation. The output of the amplifier of FIG. 4 is taken between ground and the common circuit point 39. Although not shown in FIG. 4, common point 39 is connected to shield 30 of transducer 22 so as to avoid shunting capacitor 28 with stray or spurious capacitances.

In operation, transducer 22 is placed on the top of the vehicle tire with antenna plate 26 positioned in confronting relation to fender 24 as shown in FIG. 1. This establishes capacitor 28 at some fixed or reference value which in turn establishes the frequency of oscillation by the oscillator formed by amplifier 34. While the vehicle body is in a quiescent state, analysis and display circuit 42 can be zeroed based on the frequency of oscillation at the quiescent position. Thereafter, vehicle body 12 is displaced from the quiescent condition, such as by applying force to a part of the body of the vehicle in the direction of an arrow indicated at 46. The force is terminated so that the body tends to return to the quiescent state in a manner dictated by gravity, the force stored in spring 18 and the damping action of shock absorber 20. Movement of the body with respect to transducer 22 effects a corresponding variation in the capacitance of capacitor 28 which in turn causes a variation in frequency in oscillation of the oscillator. Such varying frequency signal is analyzed by circuitry within analyzing and display unit 42 and an indication is afforded whether the damping action of shock absorber 20 is within specified ranges.

In further explanation of the operation of the apparatus and method of the invention, attention is invited to FIG. 5, a plot of vehicle deflection versus time. Horizontal axis 48 represents the position of the vehicle body with respect to axle 14 at the quiescent position and curve segment 50 indicates displacement in response to application of force 46. On termination of the force, the vehicle body returns to the quiescent state and over shoots it as shown by curve segment 52. Movement of the vehicle is reversed back toward the quiescent point and a further over shoot can occur as shown at curve segment 54. These oscillations continue in a damped manner until the quiescent position is again achieved, the particular oscillatory pattern manifested by variations in oscillator frequency indicating the operation of the shock absorber in finally damping out the oscillations of the car body.

The present invention can also be embodied in a transducer employing an inductor arranged so that the inductive reactance of the inductor varies with the distance between the inductor and the vehicle body. Referring to FIG. 6, there is shown a transducer 22' positioned on a tire 16' in spaced relation to a vehicle body part, such as a fender indicated in phantom at 24'. The location of transducer 22' on tire 16' is substantially identical to the position depicted in FIG. 1. Transducer 22' includes a shield 30' which is substantially identical to shield 30 shown in FIG. 2 and which is made of ferrous metal or like magnetic material. Mounted within shield 30' is a non-magnetic spacer 56 which supports an E-shaped magnetic core 58. Core 58 includes a central leg 60 disposed between and spaced from end legs 62 and 64. Each of the legs has an upper planar surface oriented in approximate parallelism to fender 24'. Circumscribing central leg 60 is a wire coil 66. The inductance of coil 66 produces an inductive reactance across terminals 68 and 70 of the coil. Current flow through coil 60 will generate flux lines F which can be considered as originating from the surface of central leg 60 of core 58 and traveling to the surfaces of end legs 62 and 64. Such flux lines intersect body part 24' and are affected thereby in consequence of which the inductance of coil 60 varies with the distance between the coil and fender 24'. The variation of the inductance produces a corresponding variation in the inductive reactance across terminals 68 and 70. The presence of shield 30' and the configuration of core 58 cooperate to reduce the portion of the flux field that would otherwise tend to exist laterally of the core so as to maximize the effect of movement of fender 24' relative to the transducer.

Figure 7:
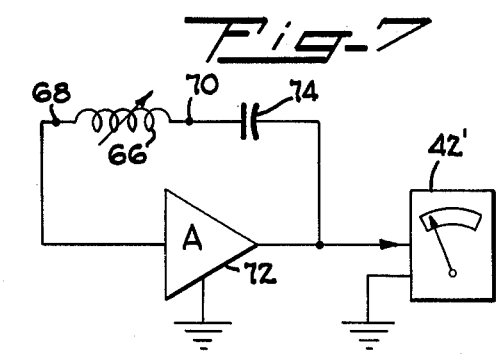
FIG. 7 is a schematic diagram of an oscillator employing the inductor of FIG. 6 as the frequency determining element.

As shown in FIG. 7, coil 66 is incorporated into the feedback circuit of an oscillator. The oscillator includes an amplifier 72, a portion of the output of which is fed back through a capacitor 74 and inductor 66 to the input of the amplifier in order to sustain oscillation. Because the inductive reactance of inductor 66 establishes the frequency of oscillation of the oscillator, the magnitude of such frequency is proportional to the distance between transducer 22' and fender 24'. The output of the oscillator is connected to an analyzing and display unit 42', which is substantially equivalent to analyzing and display unit 42. Accordingly, the operation of the embodiment of the invention shown in FIGS. 6 and 7 is substantially identical to that described above. That is to say, transducer 22' is placed on tire 16' in opposition to vehicle body part 24' such that the flux field produced by the transducer is linked with the body part. Then the springs and shock absorber of the vehicle are displaced by a force such as that indicated at 46 in FIG. 1, and the vehicle body is permitted to return to a quiescent state which occurs as explained above in connection with FIG. 5. This causes a variation in the magnitude of the inductive reactance of coil 66 which in turn causes a variation in the frequency of oscillation of the oscillator circuit. Such varying frequency is analyzed and displayed on unit 42' to afford an objective indication of shock absorber condition and performance.

Figure 9:
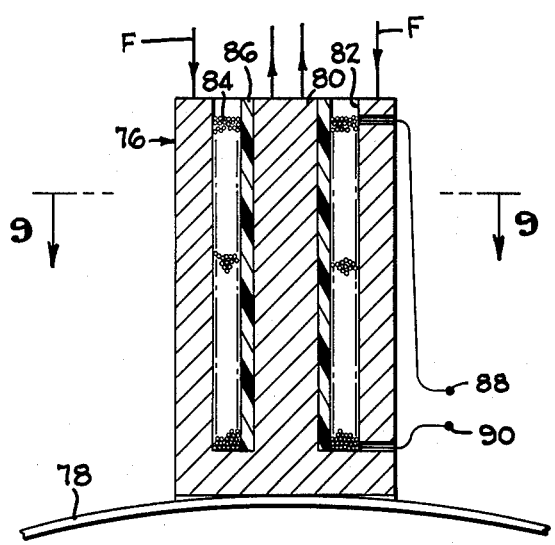
FIG. 9 is a cross-sectinal view taken along line 9—9 of FIG. 8.
Figure 8:
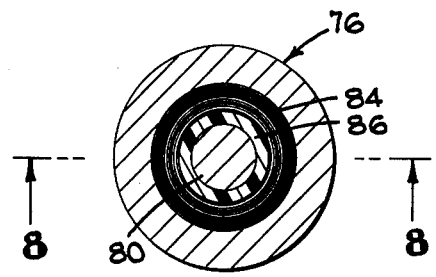
FIG. 8 is an elevation view in cross-section of an alternate form of inductive transducer, the view being taken along line 8—8 of FIG. 9.

An alternate form of inductive transducer is shown in FIGS. 8 and 9. Such alternate form includes a body of magnetic material 76 which is mounted on an arcuate non-magnetic shoe 78 that has a radius of curvature corresponding to that of the vehicle tire so that the body is maintained on the tire in an upright position. The body is of cylindric shape and has an outer shield portion 78 and an inner core portion 80 which are separated from one another by a cylindric space 82. The shield and core portions have planar upper surfaces that are oriented in approximate parallelism to the vehicle fender or like body part. Disposed within the cylindric space is a coil 84 which is wound on a non-magnetic form 86 to facilitate installation of the coil within the cylindric space. Coil 86 has externally accessible terminals 88 and 90; the capacitive reactance across the terminals has a magnitude proportional to the inductance of coil 84. The transducer of FIGS. 8 and 9 produces a flux field very similar to that described hereinabove in connection with FIG. 6, the lines constituting the field being indicated in FIG. 8 at F. Such flux field intersects the automobile fender or like vehicle body part so that variations in the distance between core body 76 and the vehicle body part with which it is flux linked causes a corresponding variation in the inductive reactance at terminals 88 and 90. Such variation in inductive reactance effects a corresponding variation in the frequency of the oscillator circuit which, when analyzed and measured against time, will afford an objective indication of the performance characteristics of the shock absorber.

In the foregoing description of the preferred embodiments of the invention the operational details of analyzing and displaying unit 42 have not been disclosed. The reason for this is that the specific nature of the unit can take one of any number of forms well within the purview of the skilled artisan. The specific output produced by the unit can be any number of forms depending on, among other things, the skill of the persons who will operate the equipment. For example, in one system designed according to the present invention the output of unit 42 is a D'Arsonval meter having a reference mark at or about mid range and calibrated so that a meter reading above the mark indicates a defective shock absorber and a reading below the mark indicates an acceptable shock absorber.

Thus it will be seen that the present invention provides a method and apparatus for testing shock absorbers which can be practiced without cumbersome attachments to the vehicle and which can produce an objective indication of shock absorber condition. Although several embodiments have been shown and described it will be obvious that other adaptations and modifications can be made without departing from the true spirit and scope of the invention.

What is claimed is:

1. Apparatus for in situ testing of a vehicular shock absorber wherein the shock absorber extends between an axle part of the vehicle and a body part of the vehicle to damp relative movement therebetween comprising transducer means having a reactive element cooperable with one of the parts to form a reactance with the one part that has a magnitude proportional to the distance between said transducer and the one part of the vehicle, means for supporting said transducer immovably with respect to only the other vehicle part and in spaced apart relation to the one vehicle part such that the magnitude of the reactance is proportional to the distance between the parts, and means for measuring and analyzing the output signal of said transducer in response to relative motion between the parts.

2. Apparatus according to claim 1 wherein said measuring and analyzing means includes an oscillator having a feedback circuit, said reactance being included in said feedback circuit so that the frequency of oscillation of said oscillator is proportional to the instantaneous magnitude of said reactance.

3. Apparatus according to claim 1 wherein said reactive element comprises a magnetic core having a first portion and a second portion spaced from said first portion and a coil circumscribing said first portion for producing a flux field between said core portions which flux field intersects the one vehicle part so that the inductive reactance of said coil varies with movement of said one vehicle part relative to said core.

4. Apparatus according to claim 3 wherein said first and second core portions terminate in respective first and second planar faces, said faces residing in substantially parallel planes, and wherein said transducer supporting means supports said core so that said faces are approximately parallel to said one vehicle part.

5. Apparatus according to claim 3 wherein said magnetic core is of generally E-shaped configuration having an upstanding central leg constituting said first core portion and two oppositely laterally spaced side legs constituting said second core portion, said core being of unitary integral construction.

6. Apparatus according to claim 3 wherein said core includes a central cylindric leg constituting said first portion and an annular housing circumscribing said central leg and constituting said second portion, said annular housing being spaced from said central leg to define a cylindric space therebetween, said coil residing in said cylindric space.

7. A method for in situ testing of a vehicular shock absorber wherein the shock absorber extends between an axle part of the vehicle and a body part of the vehicle to damp relative movement therebetween comprising the steps of providing a transducer that forms with one of the parts a reactance having a magnitude proportional to the distance between the transducer and the one part, supporting said transducer in immovable relation to only the other part so that the transducer resides in spaced apart relation to the one part thus to produce a reactance that has a magnitude proportional to the distance between the transducer and the one part, displacing the vehicle body to move the parts from a quiescent position, terminating said displacing step to permit the parts to return to the quiescent position, and measuring the time variation of the reactance as the parts return to the quiescent position.

8. A method according to claim 7 including the step of shielding said transducer from ground potential so that the reactance between the transducer and the one part is substantially free from being shunted by stray reactances.

9. A method according to claim 7 including the step of providing an oscillator having a feedback circuit, connecting the reactance in the feedback circuit so that the magnitude of the reactance determines the frequency of oscillation, the variation in the frequency of oscillation constituting the output signal.

10. Apparatus for in situ testing of a vehicular shock absorber wherein the vehicle has a body part and an axle part and wherein the shock absorber extends between the parts to damp relative movement therebetween comprising a transducer, means for mounting the transducer immovably with respect to only one part and in confronting relation to the other part and without mechanical attachment to the other part, said transducer interacting with the other part solely through the space between the parts to produce a signal that varies in proportion to the distance between the parts, and means for measuring and analyzing the output signal of the transducer in response to relative motion between the vehicle parts.

11. Apparatus according to claim 10 wherein said transducer includes means for producing an electromagnetic field within the space between the vehicle parts for affording interaction with the other part and wherein said measuring and analyzing means includes means responsive to the magnitude of said interaction.

* * * * *